(No Model.)
H. TAPPER.
ROLLER SKATE.
No. 253,784. Patented Feb. 14, 1882.
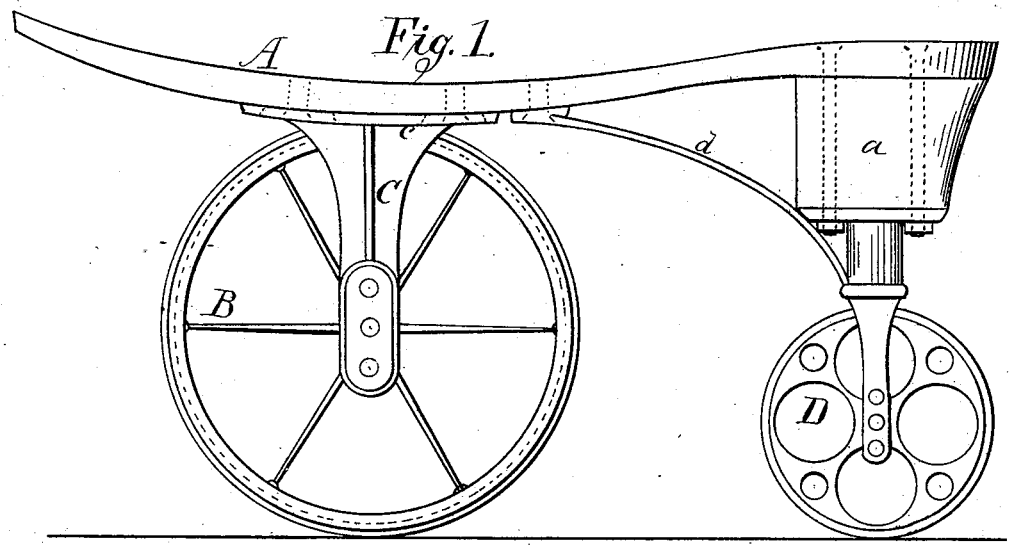
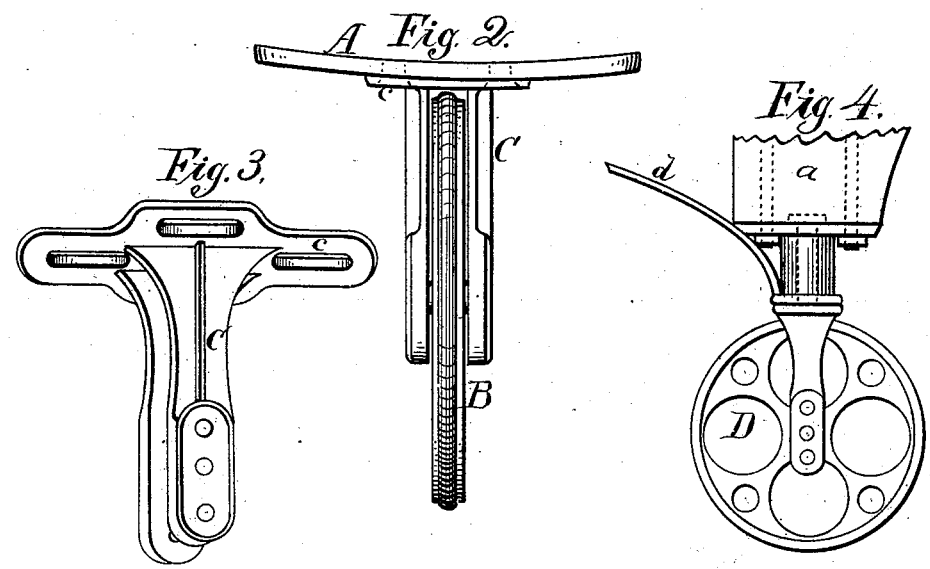
Witness,
A. J. Williams
F. W. Cadwell
Inventor,
Henry Tapper,
By Geo. W. Tibbitts, Atty.

UNITED STATES PATENT OFFICE.

HENRY TAPPER, OF CLEVELAND, OHIO.

ROLLER-SKATE.

SPECIFICATION forming part of Letters Patent No. 253,784, dated February 14, 1882.

Application filed December 12, 1881. (No model.)

*To all whom it may concern:*

Be it known that I, HENRY TAPPER, of Cleveland, in the county of Cuyahoga and State of Ohio, have invented a certain new and useful Roller-Skate, of which the following is a specification.

The nature and objects of this invention will fully appear from the subjoined description, when considered in connection with the accompanying drawings, in which—

Figure 1 is a side elevation of my improved roller-skate. Fig. 2 is a front end elevation. Fig. 3 is an under side view of the front wheel bracket.

The principle of the construction of my invention is the employment of one main or propelling wheel, located under the central part of the ball of the foot of the wearer, in the line of the center of gravity of the body, and of a second or rear wheel or caster underneath the heel, both of said wheels being in line under the central part of the foot, the rear wheel or caster arranged so as to follow the main or propelling wheel in all of its movements in forward or curved lines performed by the skater. The principal object of the rear wheel or caster is to enable the wearer to preserve his equilibrium.

The construction of my improved roller-skate is substantially as follows:

A is the sole or foot plate, which may be made in the usual form, of wood or iron, as may be desired, with heel-piece *a*.

B is the main wheel, journaled in a suitable adjustable bracket, C, secured to the under side of the sole A. This wheel I make from about four to eight inches in diameter, or such size as may be deemed advisable, the object being to attain greater speed. It may be made of iron or wood, with spokes or open-work web, in order to be as light weight as possible. If made of iron, the rim of felly may be made with a groove in its periphery and have a rubber tire, which would render it noiseless and less liable to slip on the floor, and also have greater traction on the floor. The plate or flange *c* of the bracket C has slots for the screws which secure it to the sole A, for the purpose of enabling it to be adjusted back or forward to suit the feet of the wearer.

D is the rear or supporting wheel or caster, arranged in a post or bracket attached to the bottom of the heel *a* by means of bolts or otherwise, and is supported by a brace, *d*. This wheel D may be permanently fixed in the yoke at the lower end of the post, or it may be swiveled, so as to turn and follow the forward wheel in curved movements; but as a general rule the skater will run only on the forward or main wheel, raising the heel slightly from the floor.

The rear wheel, D, like the forward wheel, B, may be made of either wood or iron.

Having described my invention, I claim—

In roller-skates, the main or propelling wheel B, pivoted in bracket C and adjustably fixed under the sole A, and the rear wheel or caster, D, fixed in post and brace *d* to the bottom of heel *a*, all constructed to operate substantially as specified.

HENRY TAPPER.

Witnesses:
GEO. W. TIBBITTS,
M. G. NORTON.